Patented Nov. 7, 1939

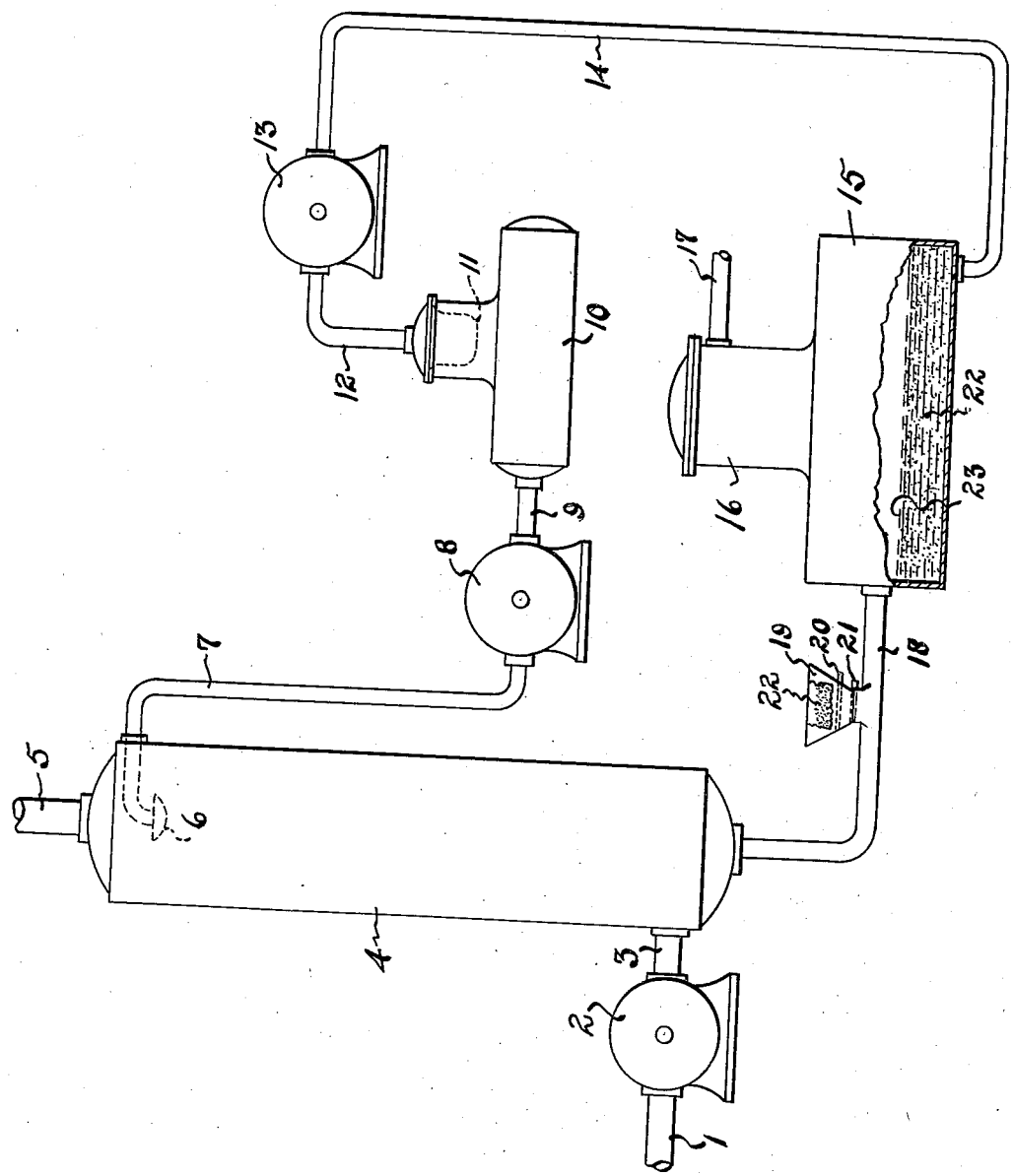

2,178,968

UNITED STATES PATENT OFFICE 2,178,968

METHOD OF PRODUCING CARBON DIOXIDE

Ralph H. McKee, New York, and James W. Martin, Yonkers, N. Y., assignors to Macmar Corporation, New York, N. Y., a corporation of Delaware Application November 23, 1937, Serial No. 176,046

9 Claims. (Cl. 23—150)

This invention relates to improvements in the method of releasing carbon dioxide gas from the potassium bicarbonate solution resulting from the potassium carbonate solution method of recovering carbon dioxide from flue gases to increase the amount of carbon dioxide released from the solution.

A general object of this invention is to provide a method of increasing the amount of carbon dioxide gas recovered from lye solutions employed in the recovery of carbon dioxide gas from waste or flue gases.

More specifically it is an object of this invention to improve the method of carbon dioxide recovery disclosed in United States Letters Patent No. 2,043,109 issued to McKee and Winter on June 2, 1936.

Other and more specific objects of this invention successfully attained by the method herein disclosed will become apparent from the following description.

This invention resides substantially in the steps and series of steps in accordance with the disclosure herein.

In the accompanying drawing the single figure is a diagrammatic view of one form of apparatus in which the improved method herein may be carried out.

Generally speaking, the invention herein disclosed is concerned with the modification of the more or less standard method of recovering carbon dioxide gas from flue or lime kiln gases in which the fuel employed is either coal, coke, oil or gas. As will be apparent from the following description, other sources of carbon dioxide containing gases may be used as the source.

Briefly, the standard process of recovering carbon dioxide gas from the mixtures of flue or kiln gases, commonly employed as a source, consists in moving the gas mixtures after they are freed from impurities such as dust, sulphur dioxide, and the like, in countercurrent to a stream or spray of an alkaline solution such as potassium or sodium carbonate. The potassium carbonate unites with the carbon dioxide in the gas mixture to form potassium bicarbonate and the solution thereof is then heated, generally in another vessel, for the purpose of releasing the carbon dioxide, reconverting the potassium bicarbonate to potassium carbonate for recycling.

It is well known that the decomposition or breakdown of the potassium bicarbonate solution by heating is by no means complete. In an efficiently run plant in accordance with present practice, the potassium carbonate solution is converted to the extent of about 70% into potassium bicarbonate and in the heating step only about 40 to 50% of the absorbed carbon dioxide in the solution is released. The present invention involves a modification of this standard practice by which the percentage of carbon dioxide gas recovered from the bicarbonate solution is increased without increasing the cost of the process by the use of additional heat.

This deficiency in the standard practice has been recognized for many years and although much effort has been expended on the methods of increasing the amount of carbon dioxide gas picked up by the potassium carbonate, little effort has been spent in increasing the percentage of carbon dioxide released from the potassium bicarbonate.

In accordance with this invention sharp-edged particles, such as ground coke, wood charcoal, graphite, iron oxide or siliceous materials are introduced into the bicarbonate solution which during the heating step causes much more rapid and complete evolution and release of the carbon dioxide from the bicarbonate solution. Of these materials it is preferred to use wood charcoal, because it is light and stays in suspension in the solution and in addition is insoluble therein. While siliceous materials are suitable they have the disadvantage that they are gradually acted upon by the alkaline solution and change in part into soluble silicates, thus progressively decreasing the amount thereof and requiring control and replacement to insure maximum efficiency. Graphite, due to its higher density settles more rapidly and also is more expensive than wood charcoal.

In carrying out the improved method it is preferred to filter out the suspended particles before the solution is returned to the absorption tower. While the presence of these materials does not affect the rate of absorption of the carbon dioxide in the alkaline solution, some loss thereof is entailed by reason of the fact that they settle on the filling material in the absorption tower and are lost for the useful purposes of the invention.

It is preferred to use these materials of a fineness in the range of particles which will pass through a standard 40 mesh wire screen, but be retained by a 100 mesh screen, rather than any larger particles or particles of colloidal dimensions. The use of particles of this size rather than finer sizes also facilitates the filtration thereof from the solution.

For the purpose of further explaining the nature of the invention, reference is here made to the drawing. The pipe 1 extends from the usual scrubber through which the flue or kiln gases are passed to remove the dust particles, sulphur dioxide and other impurities. The scrubbed gas mixture is delivered by the pump or blower 2 through the connection 3 into the absorption tower 4 which contains a suitable filling. The nature and construction of the tower and the filling materials are well known in the art. The gas mixture flows upwardly through the filling material to the top of the tower and in its movement encounters a downward stream or spray of potassium carbonate discharged from the spray or nozzle 6. The spray 6 is connected to the outlet of pump 8 by means of a pipe 7. The inlet of the pump is connected by pipe 9 to a tank 10 in the top of which is a suitable filter 11. The solution from the boiler 15 is carried through pipe 14 by a pump 13 which discharges it through the connection 12 into the tank 10 through the filter 11. The boiler 15 is provided with a dome 16 having the gas discharge connection 17. The lower end of the tower is connected by a pipe 18 with the boiler 15.

For purposes of illustration, there is shown a hopper 19 mounted on the pipe 18 and provided with a double gate arrangement 20, 21. Into the hopper are placed the sharp-edged particles which are to be introduced into the bicarbonate solution coming from the tower. By providing the double gate arrangement 20, 21 it is possible to introduce a desired quantity of the particles into the pipe 18 without opening it. The bicarbonate solution is shown at 23 in the boiler having suspended therein the particles 22.

The carbonate solution moving down through the tower 4 and mingling with the rising gas mixture dissolves the carbon dioxide and becomes converted to a bicarbonate. It thus flows through pipe 18 to the boiler 15 and has introduced into it the sharp-edged particles. In the boiler it is heated in accordance with common practice so that it breaks down into a carbonate and the released carbon dioxide gases are withdrawn through the connection 17. The hot carbonate solution is then pumped into the receiver 10 and in passing through the filter 11 leaves the sharp-edged particles behind. If desired the solution may be cooled in any suitable manner at this point. It is then pumped as needed to the nozzle 6 and again sprayed into the tower.

In addition to the advantages emphasized above, it is pointed out that a carbonate solution more rapidly absorbs carbon dioxide than does a mixture of a carbonate and a bicarbonate solution. It follows, therefore, that the more completely the bicarbonate solution is reconverted to a carbonate solution the more rapid and complete is the recovery of carbon dioxide from the flue gas mixtures.

The lean gases pass to waste through the connection 5 or may extend to a separate tower in accordance with the disclosure in the above-mentioned Patent No. 2,043,109, for further treatment. In other words, the process herein disclosed may be applied to the process in the form disclosed in that patent.

It will be apparent to those skilled in the art that the method of introducing the sharp-edged particles into the bicarbonate solution before it reaches the boiler may be carried out in many ways and particularly there may be devised apparatus for continuously and automatically introducing the particles in the proper quantities into the solution. This idea might likewise be interconnected with the filtering system so that as the particles are recovered from the carbonate solution they are automatically returned to the bicarbonate solution.

The effectiveness of the invention herein disclosed is at once apparent when the results of the following test are considered. A solution carrying 16% potassium carbonate was treated with a gas containing carbon dioxide until 55% of the potassium carbonate had been changed to potassium bicarbonate. To one portion of this solution 0.1% charcoal particles were added and the resulting solution with the suspended charcoal heated. At the same time another portion of this solution, but free from suspended sharp particles, was heated under parallel conditions. In eight minutes the percentage of carbon dioxide which had been absorbed by the potassium carbonate solution and which was evolved by the new process was 56%, while by the old process the percentage evolved was 43%. In sixteen minutes by the new process 90% of the absorbed carbon dioxide was evolved while in the other portion where no charcoal was used only 62% was evolved. The general result of this invention may be expressed by stating that the capacity of a given equipment of this type may be increased as much as 50% at substantially no additional cost other than the addition of the filtration equipment.

The new process likewise improves the method of carbon dioxide recovery where aqueous solutions of organic amines are the absorbents. The resulting amine carbonates are the equivalent of a potassium bicarbonate solution in the present invention, and in the claims covering this invention.

It will be apparent to those skilled in the art that the principles and details of this invention may be varied without departure from the novel subject matter herein. We do not, therefore, desire to be strictly limited to the disclosure as given for purposes of illustration, but rather to the scope of the claims granted us.

What we seek to secure by United States Letters Patent is:

1. In the method of releasing carbon dioxide gas from a bicarbonate solution, the step of heating the solution while having suspended therein sharp-edged inert particles.

2. In the method of decomposing a bicarbonate solution to recover carbon dioxide gas therefrom, the step of heating the solution in the presence of carbon particles suspended throughout the solution.

3. In the method of decomposing a bicarbonate solution to recover carbon dioxide gas therefrom, the step of heating the solution in the presence of coke particles suspended throughout the solution.

4. In the method of decomposing a bicarbonate solution to recover carbon dioxide gas therefrom, the step of heating the solution in the presence of siliceous particles suspended throughout the solution.

5. In the method of releasing carbon dioxide gas from a bicarbonate solution, the step of heating the solution while having suspended therein wood charcoal particles.

6. A method of recovering carbon dioxide gas from gaseous mixtures containing the same which includes the steps of contacting the gaseous mixture with a carbonate solution to form a bicarbonate solution, suspending sharp-edged inert particles in the bicarbonate solution and heating the solution to evolve carbon dioxide gas.

7. A method of recovering carbon dioxide gas from gaseous mixtures containing the same which includes the steps of contacting the gaseous mixture with a carbonate solution to form a bicarbonate solution, suspending sharp-edged inert particles in the bicarbonate solution, heating the solution to evolve carbon dioxide gas, filtering the particles from the solution, and again contacting it with the gas mixture.

8. A method of recovering carbon dioxide gas from gaseous mixtures containing the same which includes the steps of contacting the gaseous mixture with a carbonate solution to form a bicarbonate solution, suspending particles of carbonaceous material in the bicarbonate solution, heating the solution to evolve carbon dioxide gas, filtering the particles from the solution, and again contacting it with the gas mixture.

9. A method of recovering carbon dioxide gas from gaseous mixtures containing the same which includes the steps of contacting the gaseous mixture with a carbonate solution to form a bicarbonate solution, suspending wood charcoal particles in the bicarbonate solution, heating the solution to evolve carbon dioxide gas, filtering the particles from the solution, and again contacting it with the gas mixture.

RALPH H. McKEE.
JAMES W. MARTIN.